INVENTOR.
ARMAND JEAN COURTIER

BY

Bauer and Seymour
ATTORNEYS

July 7, 1959  A. J. COURTIER  2,893,924
SEPARATION AND PURIFICATION OF ANHYDRIDES OF ORGANIC DIACIDS
Filed April 17, 1956  3 Sheets-Sheet 2

INVENTOR.
ARMAND JEAN COURTIER
BY
Bauer and Seymour
ATTORNEYS

United States Patent Office 2,893,924
Patented July 7, 1959

2,893,924

SEPARATION AND PURIFICATION OF ANHYDRIDES OF ORGANIC DIACIDS

Armand Jean Courtier, Meudon, France, assignor to Societe Anonyme des Manufactures des Glaces et Produits Chimiques de St. Gobain, Chauny & Cirey, Paris, France Application April 17, 1956, Serial No. 578,821

1 Claim. (Cl. 202—42)

This invention relates to the separation and purification of anhydrides of organic diacids, such as the phthalic and maleic anhydrides. The process of the invention is especially useful for separating and purifying anhydrides after their preparation by catalytic oxidation of the corresponding aromatic hydrocarbon.

The process of the invention is particularly of advantage in separating and purifying those anhydrides of organic diacids, such as maleic anhydride, which are insoluble or nearly insoluble, in aliphatic hydrocarbons at high temperatures. The process of the invention may also be employed to advantage to separate and highly purify anhydrides of organic diacids which are soluble in such hydrocarbons at high temperatures.

The process of the invention generally consists of dissolving the anhydride in a solvent, generally called a "third" solvent hereinafter, distilling the anhydride solution thus obtained in the presence of an aliphatic hydrocarbon which boils at a temperature exceeding about 190° C. under atmospheric pressure, condensing the vapor resulting from the preceding distillation, and cooling the liquid resulting from such condensation. Such liquid is then separated into two phases, one of which is rich in anhydride, so that the anhydride may be readily isolated from such phase.

The invention has among its objects the provision of a novel and easily practiced method of separating and purifying anhydrides of organic diacids.

A further object of the invention resides in the provision of a process for separating and purifying anhydrides of organic diacids which are substantially insoluble in aliphatic hydrocarbons at elevated temperatures.

Yet another object of the invention resides in the provision of a method of separating and purifying anhydrides of organic diacids by the use of economical solvents and carrying liquids, and the use of recycling procedures to recover substantially all of the solvents and carrying liquids.

Yet another object of the invention, in one embodiment thereof, resides in the use, in the process of the type described, of a solvent which mixes with the carrying liquid, the solvent and carrying liquid being separated by distillation and then being recirculated.

Yet another object of the invention, in another preferred embodiment thereof, lies in the use, in a process of the type indicated, of a solvent which does not mix with the carrying liquid, and separating the solvent and the carrying liquid by decantation, and then recirculating the solvent and carrying liquid.

The above and further objects of the invention will be more readily understood upon consideration of the following specification, and of the accompanying drawings forming a part thereof, such specification describing preferred embodiments of the process of the invention.

Figure 1:
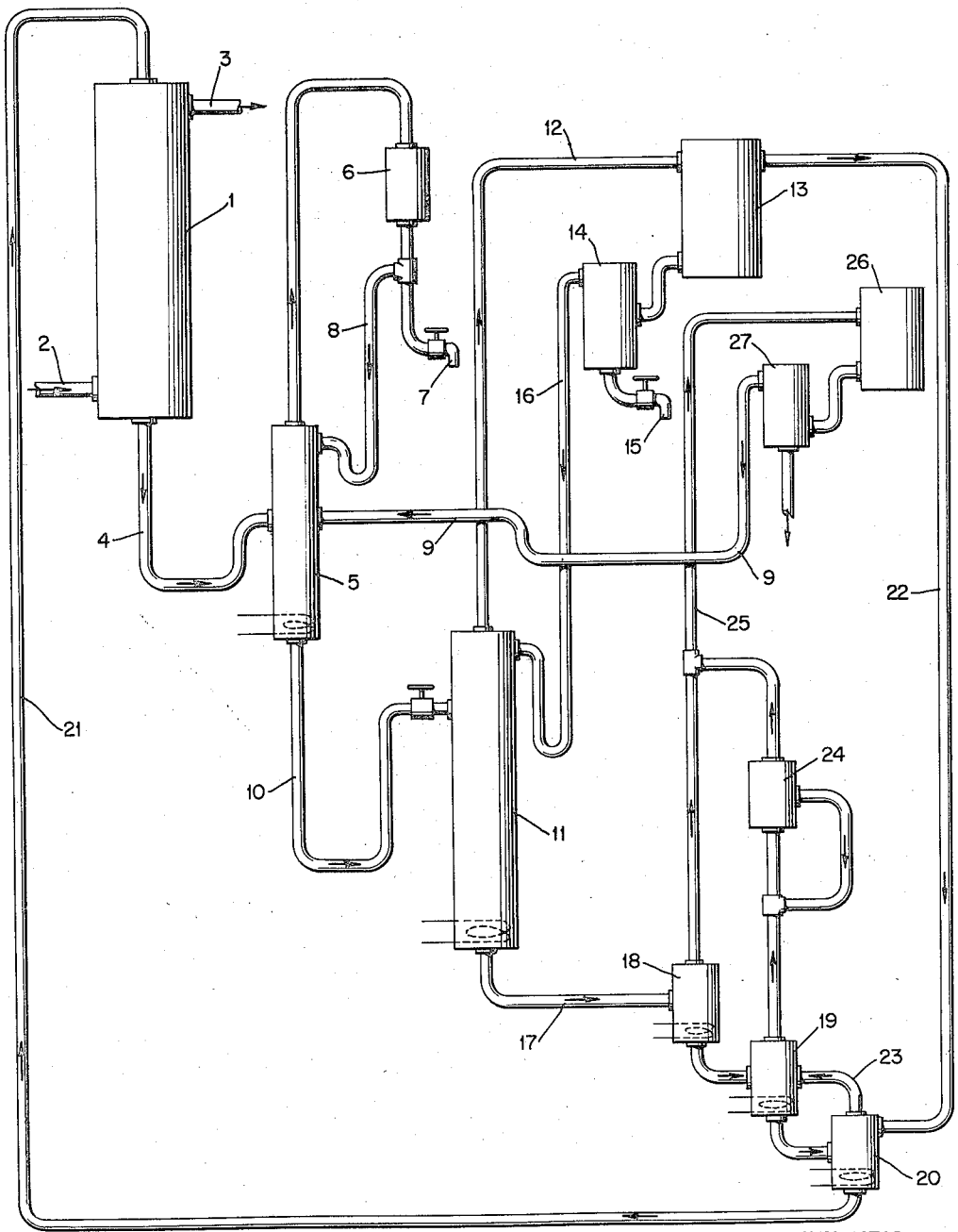
Figure 1 is a schematic diagram of an industrial installation of apparatus for carrying out a process of separating and purifying maleic anhydride according to one embodiment of the invention wherein the third solvent and the carrying liquid form a mixture.

The "third" solvent employed in practicing the invention is a solvent of the anhydride to be recovered. In addition, the solvent employed must be one which does not mix with water, which has no action on the anhydride at the temperature of distillation of the mixture of the anhydride, the third solvent, and the carrying liquid employed in carrying out the process, and which is liquid at the temperature of such distillation and is not removable with the anhydride in the course of the distillation of such mixture. The carrying liquid is an aliphatic hydrocarbon boiling at a temperature exceeding about 190° under atmospheric pressure.

The process of the invention depends upon the discovery that in the solution submitted to distillation the presence of the anhydride solvents with the properties described above does not prevent the formation of a binary azeotropic mixture of the anhydride with the hydrocarbon, and that the solvent is not removed during the distillation of such azeotropic mixture. While such distillation of the mixture is being effected, the third solvent, hydrocarbon, and anhydride being present, the impurities of the anhydride are not carried off, so that the anhydride is thus isolated from the azeotropic mixture, and a high degree of purity of the isolated anhydride is thus achieved. The impurities, which remain in the distillation residue, can be easily recovered. Such impurities, especially the benzoquinones, are often valuable products.

Among the suitable "third" solvents which may be employed in the practice of the present invention are the following: diphenyl pentachloride, tricresyl phosphate, dibutyl phthalate, ethyl tetrachlorophthalate, heptachloropropane, hexachloropropane, and naphthalene chloride. Thus not only hydrocarbons but solvents having a hydrocarbon nucleus are useful. In general, organic solvents answering the requirements of the preceding are all useful.

Among the aliphatic hydrocarbons useful as carrying liquids are saturated hydrocarbons or mixture of them, such as petroleum fractions that boil between 190° and 250° C. at atmospheric pressure. When the process is used for separating and purifying maleic anhydride it is more advantageous to use as a carrying liquid a hydrocarbon fraction with a lower boiling range, for instance, between 205° and 215° C. at atmospheric pressure. When used for separating and purifying phthalic anhydride it is preferable to use a hydrocarbon fraction whose boiling point is about 245° C. at atmospheric pressure.

As will be apparent from the above, there are shown in the drawings diagrams of four different industrial installations of apparatus for carrying out the process of the invention. The first portions of each of such installations are generally similar except for differences in the sizes and proportions of the washing column 1, the distillation column 5, and the rectification column 11. Similar parts in the various figures will be referred to by the same reference characters. Where sizes and proportions of columns and the like differ, or where pipes lead to different elements, such parts will be referred to in Figures 2, 3 and 4 by the same reference characters used in Figure 1 but with an added letter suffix.

The apparatus employed in carrying out the process of the invention will first be described generally in connection with Figure 1 which shows apparatus which is used when the third solvent and the carrying liquid form a mixture and are thus separated by distillation. The process, and the apparatus used in carrying out the process of the invention, will then be described generally in connection with Figures 2 and 4, wherein the third solvent and the carrying liquid do not mix, and thus may be separated by decantation. Finally, each of Figures 1–4, inclusive, will be discussed in connection with specific embodiments of the process, designated Examples 1–4, inclusive, respectively.

Turning now to Figure 1, the hot gases resulting from the catalytic oxidation of aromatic hydrocarbons are led to the lower end of a washing column 1 through a pipe 2, and are washed by the third solvent which is fed into column 1 at the top thereof through a pipe 21. The anhydride and major part of its impurities are dissolved in the third solvent, and the residual gas leaves column 1 through a pipe 3. The solution of the anhydride and its impurities in the third solvent is then led through pipe 4 from the bottom of column 1 into a distillation column 5, where it is mixed with carrying liquid entering the column 5 through pipe 9. The head fractions from such resulting mixture are led to condenser 6, which is provided with a draining valve 7 and a pipe 8 for return flow of the condensate to the top of column 5.

The mixture of anhydride, its impurities, the third solvent, and the carrying liquid leaves the bottom of column 5 through pipe 10 and enters rectification column 11 intermediate its length. Column 11, which is of conventional structure, is provided with plates. Column 11 separates such mixture into two portions: (1) the portion which is distilled and consists of the binary anhydride-hydrocarbon azeotropic mixture, and (2) the residue, which is formed by the third solvent having the impurities of the anhydride in solution, and a little hydrocarbon.

Portion (1), the binary azeotropic mixture, leaves column 11 through pipe 12 which leads it into a condenser 13 and then into a decanter 14 where it is separated into two layers. The lower layer, which is rich in anhydride, may be drained off from decanter 14 by a valve 15. The upper layer is returned by a pipe 16 to the top of column 11. Portion (2) leaves the bottom of column 11 through a pipe 17 and is led successively into serially connected heaters 18, 19, and 20, which are heated in that order to successively increased temperatures. Such heaters separate portion (2) into carrying liquid and third solvent. The third solvent flowing from the base of the heater 20 is, if required, purified by being centrifuged, and is then led back into circulation through the pipe 21. The carrying liquid is to a large extent separated from the third solvent by means of direct distillation in the heater 18, substantially complete separation of the third solvent and carrying liquid being achieved by contact with hot steam in the heaters 19 and 20. The steam which feeds the heaters 19 and 20 is derived from the condenser 13, from which it is led through a pipe 22 to the heater 20 and thence through a pipe 23 to the heater 19. A dephlegmator 24, placed between the heater 19 and pipe 25 by means of which the carrying liquid is returned to the system, makes it possible to collect the last impurities of the third solvent, which are mostly quinones, which can be carried off by hot steam.

Figure 2:
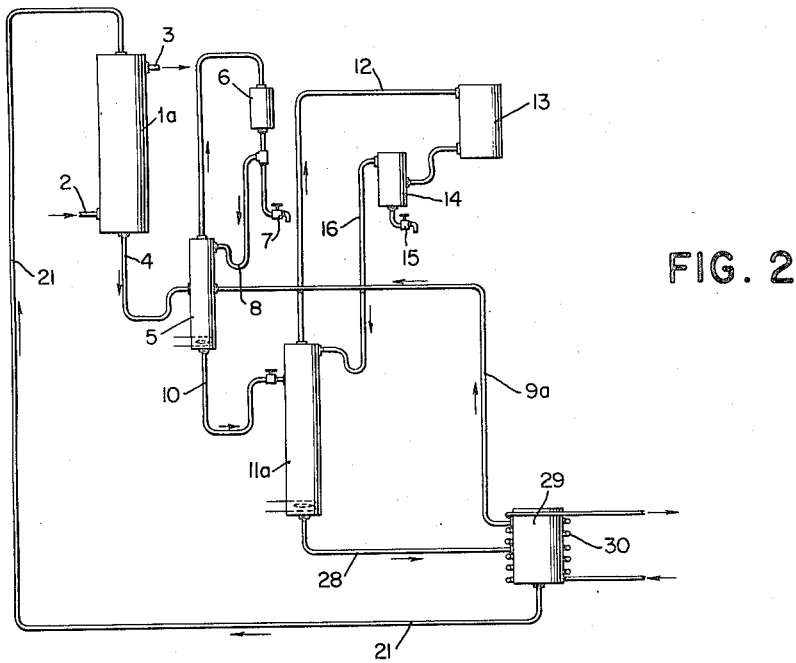
Figure 2 is a schematic diagram of an industrial installation of apparatus for carrying out a second embodiment of a process for separating and purifying maleic anhydride, in such second embodiment there being employed a solvent which does not mix with the carrying liquid.
Figure 3:
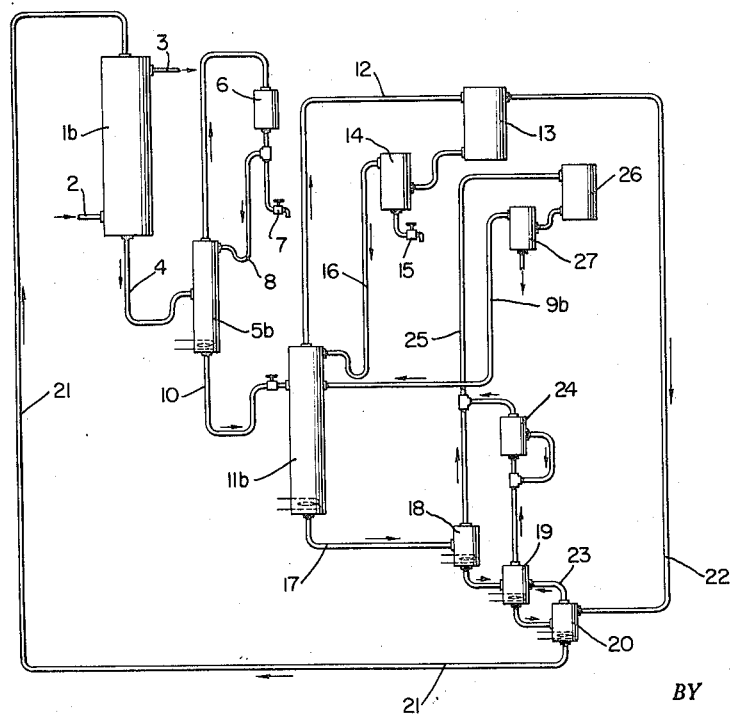
Figure 3 is a schematic diagram of an industrial installation of apparatus for carrying out a third embodiment of the process of separating and purifying anhydrides in accordance with the invention, such process separating and purifying phthalic anhydride and making use of a solvent which forms a mixture with the carrying liquid.
Figure 4:
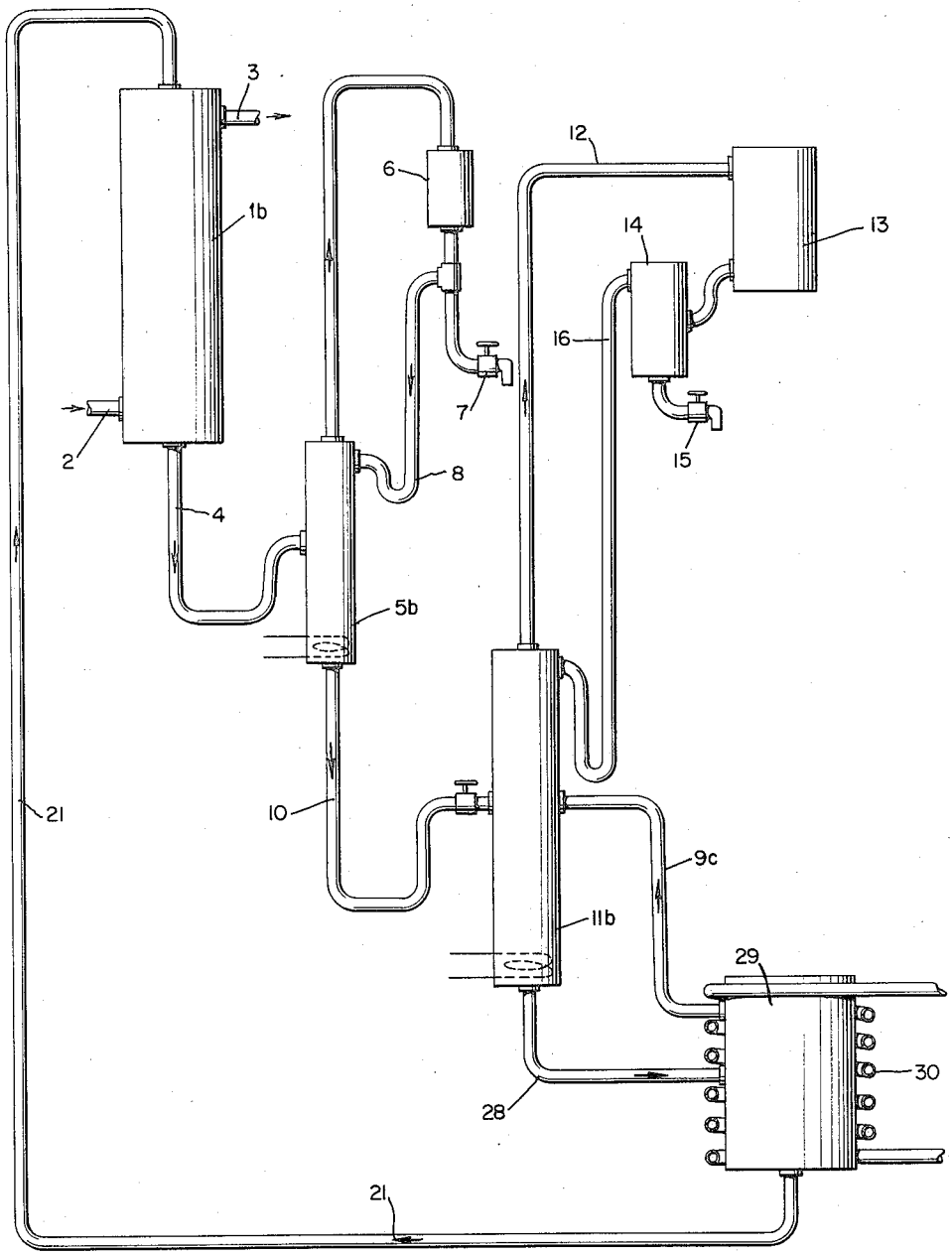
Figure 4 is a schematic diagram of an industrial installation of apparatus for carrying out a further embodiment of the process of separating and purifying phthalic anhydride, the third solvent employed in such process being of such character that it does not form a mixture with the carrying liquid.

Pipe 25 carries the carrying liquid to a condenser 26, from which it flows to a decanter 27. Water may be drawn off from the bottom of decanter 27. The above mentioned pipe 9 leads from the top of the decanter to the column 5.

Where a carrying liquid having a somewhat higher boiling point is employed, as with the separation and purification of phthalic anhydride to be described, the carrying liquid may be mixed with a solution of anhydride and third solvent in the rectification column rather than in the distillation column. Such arrangement is shown in Figure 3 where a pipe 9b leads from the top of decanter 27 to an intermediate zone in column 11b.

Where the third solvent employed is of such character that it does not mix with the carrying liquid, the final mixture of the third solvent and the carrying liquid, after removal of the anhydride therefrom, need not be distilled to effect separation of the solvent and carrying liquid. As is shown in Figures 2 and 4, such separation of the third solvent and carrying liquid may be effected simply by employing a refrigerating decanter into which the residue flowing from the bottom of the rectification column flows. The top layer in such refrigerating decanter may then be re-introduced directly either into the distillation column (Fig. 2) or the rectification column (Fig. 4). The bottom layer from the refrigerating decanter may be re-introduced into the system through pipe 21. Such third solvent may be purified as required from time to time, as by distillation.

*Example 1*

In this example, maleic anhydride is separated and purified in apparatus diagrammatically shown in Figure 1. Gas at 120° C. and containing 40 grams of maleic anhydride in crude form per cubic meter is introduced into column 1 through pipe 2 at the rate of 1000 cubic meters of gas per hour. Column 1 in this instance has a diameter of 1000 millimeters and contains 10 sections. To the top of such column, through pipe 21, there is introduced 500 liters per hour of diphenyl pentachloride having a temperature of 110° C. The diphenyl pentachloride, the third solvent, dissolves substantially all of the maleic anhydride, so that the gases which escape through pipe 3 at the top of column 1 are practically free of maleic anhydride. In practice, it is preferable to chill the gases escaping through pipe 3 in order to condense and recover any of the third solvent which may have been carried along in the gas.

Distillation column 5 has a diameter of 200 mm., contains 8 plates, and is heated at the base by steam to a temperature of 180° C. The solution of maleic anhydride in diphenyl pentachloride is introduced into column 5 at the level of the fourth plate from the top through the pipe 4. In column 5 the above solution is mixed with a carrying liquid consisting of a fraction of petroleum, which boils at between 205° and 215° C., introduced at a rate of 500 liters per hour through pipe 9 which is connected with column 5 at about the same level as pipe 4. Condenser 6 collects the head products, which are mainly benzene and water, the latter coming from the treated gas. Benzene, at the rate of from 2 to 3 liters per hour, may be withdrawn through valve 7.

Rectification column 11 in this instance has a diameter of 300 mm. and is equipped with 12 plates. Such column is heated by steam to 180° C. and is maintained under a vacuum of 200 mm. of mercury. Pipe 10, leading from the bottom of distillation column 5 to rectification column 11, connects with the latter column at the level of the fourth plate from the top and introduces thereinto the solution of anhydride, third solvent, and carrying liquid from column 5.

Condenser 13 collects about 94 kilograms per hour of a mixture resulting from the distillation of the vapors of the azeotropic mixture. Decanter 14, which is maintained at the temperature of 80° C., separates such mixture into two layers, the top layer being returned to the top of rectification column 11 through pipe 16. The lower layer in decanter 14 is drawn off through valve 15. Such lower layer is crude maleic anhydride, which forms at the rate of 40.4 kilograms per hour. When purified by distillation at 150° C. under a vacuum of 200 mm. of mercury, such crude maleic anhydride yields 40 kilograms of pure maleic anhydride per hour.

The residual solution (diphenyl pentachloride, petroleum, and impurities) is led to the series of superheaters 18, 19, and 20, which are heated with steam to a temperature of 180° C. under a constant pressure of 200 mm. of mercury. The greater part of the petroleum contained in the diphenyl pentachloride is eliminated in the superheater 18 by direct distillation, while the last traces of petroleum carried along by the steam are eliminated in the superheaters 19 and 20.

*Example 2*

In this example maleic anhydride is separated and purified by a process using tricresyl phosphate as the third solvent, and by use of apparatus schematically shown in Figure 2.

The first portion of the apparatus in Figure 2 is essentially the same as that shown in Figure 1 except for changes in the washing column, the distillation column, and the rectification column as follows: the washing column 1a has 6 sections, and has the same diameter as column 1 of Figure 1; distillation column 5 in Figure 2 is the same as that in Figure 1; rectification column 11a in Figure 2 has 18 plates, and has the same diameter as column 11 in Figure 1.

Gas at 120° C. containing maleic anhydride in crude form is introduced to washing column 1a through pipe 2. 300 liters of tricresyl phosphate is introduced per hour through pipe 21 into washing column 1a. This results in a solution, containing 150 grams of maleic anhydride per liter, which flows through pipe 4 into column 5. This solution is mixed in column 5 with 600 liters per hour of a carrying liquid consisting of a petroleum fraction having a boiling point of from 205° to 215° C. which is introduced into column 5 through pipe 9a. The distillation in column 5 is carried out in the same manner as in Example 1; the product obtained at condenser 6 is largely benzene.

The mixture of tricresyl phosphate, anhydride, and petroleum fraction are introduced into rectification column 11a through pipe 10 at the level of the fifth plate from the top. Rectification column 1a is heated by steam to 180° C. and is maintained at a vacuum of 200 mm. of mercury. The product escaping from column 11a through pipe 12 into condenser 13 is a mixture resulting from the distillation of the vapors of the azeotropic mixture. The condensed mixture is separated into two layers in the decanter 14 which is maintained at a temperature of 80° C. The lower layer, which is drawn off decanter 14 through valve 15, consists of 40.4 kilograms of maleic anhydride per hour.

The distillation residue from column 11a, consisting mainly of petroleum and tricresyl phosphate, is led through pipe 28 to a refrigerating decanter 29, which is cooled by refrigerating coils 30, as shown. In decanter 29 the residue is separated into two layers. The lower layer, consisting of tricresyl phosphate, is returned to the system by way of pipe 21. Occasionally the tricresyl phosphate recovered in decanter 29 is purified by distillation before being returned to the system through pipe 21. The top layer in decanter 29 is returned to column 5 through pipe 9a.

*Example 3*

In this example, phthalic anhydride is recovered by use of apparatus diagrammatically shown in Figure 3. The first portion of such apparatus is essentially the same as that shown in Figure 1 except for the following changes in the relative sizes of washing column 1b, distillation column 5b, and rectification column 11b: column 1b has 3 sections and a diameter of 400 mm.; column 5b has 6 plates and a diameter of 100 mm.; column 11b has 12 plates and a diameter of 400 mm.

The third solvent employed in this example is diphenyl pentachloride. The carrying liquid used is a petroleum fraction with a boiling point range between 240° and 245° C. 200 cubic meters per hour of gases at 140° C. are introduced through pipe 2 into washing column 1b. The gas which escapes from the washing column through pipe 3 is completely free from phthalic anhydride. Diphenyl pentachloride at a rate of 50 liters per hour is introduced into the top of column 1b. The resulting solution of diphenyl pentachloride and phthalic anhydride is led from washing column 1b through pipe 4 into an intermediate but upper zone in column 5b.

In column 5b the temperature of the liquid in the top section is 50° C., in the intermediate section it is 85° C., and in the lower section it is 115° C. The head fraction, which is separated under 60 mm. of mercury in column 5 and is recovered in the condenser 6, consists of 1.2 kgs. per hour of a heterogeneous mixture containing maleic anhydride.

The solution of phthalic anhydride in diphenyl pentachloride is led from the bottom of column 5b through pipe 10 into column 11b at the level of the fifth plate from the top of column 11b. The carrying liquid is, in this instance, introduced through pipe 9b into column 11b, where it mixes the solution of phthalic anhydride in diphenyl pentachloride. Column 11b is heated with steam to a temperature of 180° C. and is maintained under a vacuum of 65 mm. of mercury. The vapors of the azeotropic mixture resulting from column 11b are collected in condenser 13, which is maintained at a temperature of 129° C. Decanter 14 receives from the condenser 140 kilograms per hour of the collected liquid which it separates into two layers. The bottom layer, which is drawn off through valve 15, consists of crude phthalic anhydride which flows at a rate of 10 kilograms per hour. Such crude phthalic anhydride may be purified to free it from petroleum by being heated to 180° C. under a pressure of 50 mm. of mercury. This yields 9.8 kilograms of pure phthalic anhydride per hour.

The mixture of petroleum and diphenyl pentachloride which flows from the bottom of column 11b through pipe 17 is subjected to the same distillation operations in superheaters 18, 19 and 20 as Example 1. Diphenyl pentachloride is recovered from the bottom of heater 20 and is re-introduced into the system through pipe 21, being purified, when necessary, as by being centrifuged. The petroleum fraction and some water are led through pipe 25 to condenser 26 which then separates the water at decanter 27, the top layer in such decanter being the petroleum fraction, which is led back into column 11b through pipe 9b.

*Example 4*

In this example phthalic anhydride is separated and purified by use of tricresyl phosphate as a third solvent, and of a petroleum fraction boiling in the range 240° to 245° C. as the carrying liquid. The apparatus employed, shown in Figure 4, is the same as that of Figure 3 with the exception that, since tricresyl phosphate and the petroleum fraction do not mix, a refrigerating decanter is substituted for the steam distillation system to effect separation of the third solvent from the carrying liquid.

The extraction of phthalic anhydride in this example is carried out under the same operating conditions as in Example 3. 40 liters per hour of tricresyl phosphate are admitted to the top of washing column 1b through pipe 21. The solution leaving distillation column 5b through pipe 10 contains 25% by weight of anhydride. The liquid drawn off through valve 7, as in Example 3, consists of a heterogeneous mixture containing maleic anhydride. The mixture of tricresyl phosphate and phthalic anhydride is led into column 11b where it is mixed with the petroleum fraction used as a carrying liquid, which enters the column through pipe 9c. The azeotropic heterogeneous distillate collected in condenser 13 is led to decanter 14, crude phthalic anhydride being obtained at valve 15.

The residual liquid from column 11b is led through pipe 28 to a refrigerating decanter 29. At decanter 29 tricresyl phosphate is separated as the lower layer, and is returned to the system through pipe 21, being purified, as by being distilled, from time to time when necessary. The petroleum fraction separates as the top layer in decanter 29, and is returned to column 11b through pipe 9c.

Although for purposes of illustration I have described specific embodiments of the process for separating and purifying anhydrides of organic diacids, and have shown specific embodiments of apparatus for carrying out such process, it will be understood that the process of the invention is capable of considerable variation as to details. The invention is, therefore, to be defined by the scope of the claim appended hereto.

I claim:

The process of separating maleic anhydride from a gas in which such anhydride is entrained, which comprises washing such gases with tricresyl phosphate and thereby forming a solution of anhydride in tricresyl phosphate, first distilling the solution thus obtained so as to eliminate head fractions therefrom, then submitting the liquid remaining after the first distillation to a second distillation in the presence of an aliphatic hydrocarbon fraction having a boiling range between 205–215° C. under atmospheric pressure, and the conditions in such second distillation being so chosen that the vapor resulting from the second distillation consists almost entirely of a mixture of maleic anhydride and aliphatic hydrocarbon and the residual liquid resulting from the second distillation consists almost entirely of aliphatic hydrocarbon, tricresyl phosphate and impurities, condensing such vapor, collecting the resultant liquid, separating anhydride from such liquid, and separating by decantation the aliphatic hydrocarbon and the tricresyl phosphate from the residual liquid.

References Cited in the file of this patent

UNITED STATES PATENTS

| | | |
|---|---|---|
| 2,574,644 | Landau | Nov. 13, 1951 |
| 2,734,854 | Openson | Feb. 14, 1956 |

OTHER REFERENCES

Weissberger: Technique of Organic Chemistry, vol. IV, Distillation, Chapter III, Interscience Publishers, Inc., N.Y., 1951.